Nov. 14, 1933.  L. E. LA BRIE  1,935,403

BRAKE

Filed Jan. 28, 1929

INVENTOR.
Ludger E. LaBrie
BY *[signature]*
ATTORNEYS.

Patented Nov. 14, 1933

1,935,403

UNITED STATES PATENT OFFICE 1,935,403

BRAKE

Ludger E. La Brie, South Bend, Ind., assignor to Bendix Brake Company, South Bend, Ind., a corporation of Illinois Application January 28, 1929. Serial No. 335,433

13 Claims. (Cl. 188—78)

This invention relates to brakes, and is illustrated as embodied in an internal expanding brake for an automobile. The particular brake shown in the drawing is of the type having friction means anchoring at one end when the drum is turning in one direction and anchoring at the other end when the drum is turning in the other direction.

Various features of novelty relate to the structure of the friction means, having flexibly connected rigid segments formed by securing two separate segmental webs integrally or at least permanently to the same rim and preferably rigidly and if desired adjustably connecting a separate shoe to one end thereof, to a return spring arrangement holding the friction assembly spring-loaded so that it does not rattle, and to a simplified novel applying device which includes a floating cam or the equivalent.

The above and other novel and desirable structural and functional features will be apparent from the following description of the illustrative embodiment shown in the accompanying drawing, in which.

Figure 1:
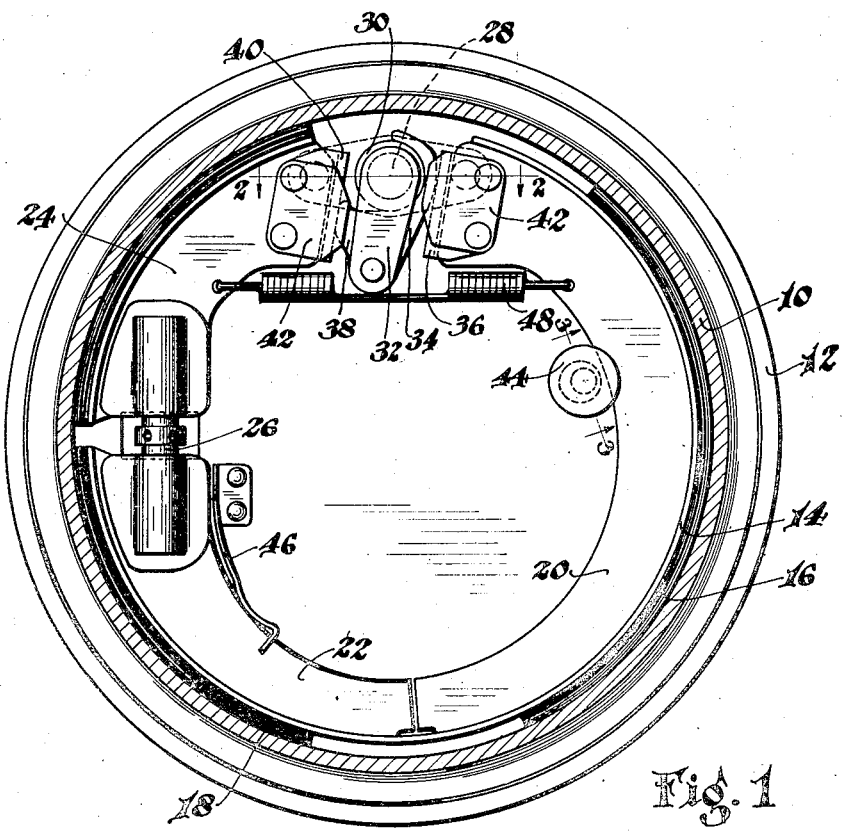
Figure 1 is a vertical section through the brake, just inside the head of the brake drum, and showing the novel brake friction means in side elevation.
Figure 2:
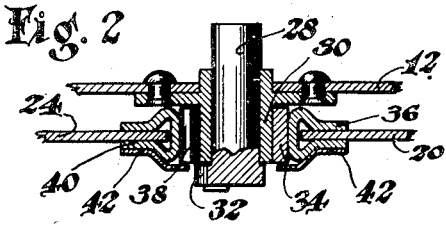
Figure 2 is a partial section on the line 2—2 of Figure 1, showing the engagement of the applying device with the friction means.
Figure 3:
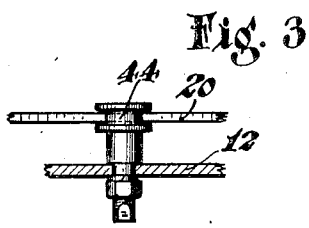
Figure 3 is a partial section on the line 3—3 of Figure 1, showing an adjustable stop for the friction means.

The brake selected for illustration includes a rotatable drum 10, at the open side of which is a suitable support such as a backing plate 12, and within which is arranged the friction means of the brake, shown as extending approximately a complete circumference and as arranged to anchor at one end when the drum is turning in one direction and to anchor at the other end when the drum is turning in the other direction.

The novel friction means which appears in the drawing includes generally at least three rigid segments, two of which are flexibly connected so that the means as a whole forms in effect an expansible friction band, and two of which are adjustably and preferably rigidly connected so that the friction means may be expanded slightly from time to time to compensate for wear.

In the arrangement shown, there is a rim 14, approximately 270 degrees long, carrying two segments 16 and 18 of brake lining and having integral therewith or welded or otherwise permanently secured thereto two corresponding webs 20 and 22, preferably approximately 180 degrees and 90 degrees in length respectively. The rim 14 connecting webs 20 and 22 serves as a flexible joint, so that the friction means is expansible in applying the brake. At the end of web 22, and arranged end to end with respect to rim 14, I prefer that there should be a short shoe 24, shown as T-shaped in section, and preferably about 90 degrees long, rigidly and adjustably connected to web 22 by a right-and-left threaded member 26 threaded with correspondingly threaded sockets in the end of web 22 and the end of the web of the shoe 24.

Between the ends of the floating friction device so formed I may arrange the shaft 28 of the brake-applying means, journaled if desired in a novel torque-taking bracket or anchor 30 riveted or otherwise secured to the backing plate 12. At the end of the shaft just beyond the end of the bearing formed in bracket 30, there is formed or secured an arm 32 projecting radially inward. A novel floating brake-applying cam or lever 34 is pivoted at its inner end to the inner end of arm 32, being arranged on the same side of the arm 32 as the shaft 28, and extends upwardly paralleling the arm 32.

Cam 34 is recessed to fit around the bearing 30 and shaft 28, engaging a wear plate 36 on the end of web 20, and has a projection 38 extending past the shaft and bearing and operatively engaging a wear plate 40 on the end of shoe 24. When the drum is turning clockwise, with the vehicle moving forward, the friction means anchors by engagement of wear plate 40 with bearing 30. When the drum is turning counter-clockwise, however, the wear plate 36 anchors through the cam 34 on the bearing 30. Stampings 42 may be secured to the sides of the wear plates 36 and 40 and arranged to project into engagement with the sides of the cam 34 to hold it laterally.

The idle position of the friction means may be determined by means such as a stop 44, preferably an adjustable grooved eccentric, carried by the backing plate and engaging and embracing the inner edge of the web 20. A leaf spring 46 opposite the stop 44 is secured at its upper end to the backing plate and preferably is forked at its lower end to embrace the web 22. Spring 46 urges web 22 outwardly, thus drawing web 20 inwardly against the stop 44. Spring 46 is weaker than a main return spring 48, preferably a coil spring tensioned between web 20 and shoe 24.

Thus spring 48 holds the ends of the friction means against cam 34 and bearing 30 when the brake is released, while spring 46 swings the entire friction means assembly to the left as far as permitted by stop 44. The two springs acting in opposition to each other hold the entire assembly spring-loaded, thus eliminating rattles.

Figure 4:
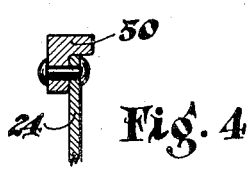
Figure 4 is a partial section showing a modified form of cam-engaging wear plate.

As shown in Figure 4, an L-shaped wear member 50 may if desired be used instead of the channel-shaped wear members 36 and 40.

While one illustrative embodiment has been described in detail, it is not my intention to limit the scope of the invention to that particular embodiment, or otherwise than by the terms of the appended claims. The above-described applying and anchorage means is claimed in my divisional application No. 691,616, filed September 30, 1933.

I claim:

1. A brake friction member having an outer rim part provided with two segmental webs arranged end to end and spaced a short distance apart to allow the rim to flex between them, and having a separate shoe connected to one end of one of the webs.

2. A brake friction member comprising, in combination, an outer rim part provided with two segmental webs arranged end to end and spaced a short distance apart to allow the rim to flex between them, a separate shoe arranged at one end of said rim, and means adjustably connecting said shoe to one of the webs.

3. A brake friction member comprising, in combination, an outer rim part provided with two segmental webs arranged end to end and spaced a short distance apart to allow the rim to flex between them, a separate shoe arranged at one end of said rim, and a rigid connection between said shoe and one of the webs.

4. A brake friction member comprising, in combination, an outer rim part provided with two segmental webs arranged end to end and spaced a short distance apart to allow the rim to flex between them, a separate shoe arranged at one end of said rim, and a rigid adjustable member connecting said shoe and one of the webs.

5. A brake friction member having an outer rim part provided with two segmental webs arranged end to end and spaced a short distance apart to allow the rim to flex between them, the webs overhanging their connections to the rim part and approaching each other near enough at their ends to limit the flexing of the rim part in one direction.

6. A brake comprising, in combination, a friction member extending approximately a full circumference, a stop at one side of said circumference engaged by the friction member when in released position, and a leaf spring on the opposite side of said circumference urging the adjacent portion of the friction member outward and thereby urging the opposite portion of the friction member inwardly against said stop and which spring is forked at its end and embraces a portion of the friction member to position it laterally.

7. A brake comprising, in combination, a friction member extending approximately a full circumference, a stop at one side of said circumference engaged by the friction member when in released position, and a leaf spring on the opposite side of said circumference urging the adjacent portion of the friction member outward and thereby urging the opposite portion of the friction member inwardly against said stop, together with a return spring stronger than said leaf spring and urging the opposite sides of the friction member toward each other, the two springs acting in opposition to each other serving to hold the assembly spring-loaded in a manner preventing rattle.

8. A brake comprising, in combination, a friction member extending approximately a full circumference, a stop at one side of said circumference engaged by the friction member when in released position, and a leaf spring on the opposite side of said circumference urging the adjacent portion of the friction member outward and thereby urging the opposite portion of the friction member inwardly against said stop, together with a coil return spring stronger than said leaf spring and tensioned between the opposite sides of the friction member, the two springs acting in opposition to each other serving to hold the assembly spring-loaded in a manner preventing rattle.

9. A brake comprising, in combination, a friction member extending approximately a full circumference, a stop at one side of said circumference engaged by the friction member when in released position, and a spring on the opposite side of said circumference and acting in a direction to urge the adjacent portion of the friction member outward and thereby urge the opposite portion of the friction member inwardly against said stop, together with a return spring stronger than said spring and urging the opposite sides of the friction member toward each other, the two springs acting in opposition to each other serving to hold the assembly spring-loaded in a manner preventing rattle.

10. A brake friction member comprising at least three segments, two of which are flexibly and permanently connected, and two of which are rigidly and adjustably connected.

11. A brake comprising, in combination, friction means having adjacent separable ends, a floating applying device between said ends, and stampings secured to the sides of said means at its ends and engaging the side of the applying device to hold it laterally.

12. A brake comprising, in combination, friction means having adjacent separable ends, a floating applying device between said ends, wear members carried by said ends and engaging the applying device, and stampings formed separately from the wear members and secured to the sides of said means at its ends and engaging the side of the applying device to hold it laterally.

13. A brake comprising, in combination, a drum, floating friction means within the drum, a shaft bearing arranged to take the braking torque from one end of the friction means when the drum is turning in one direction and from the other end of the friction means when the drum is turning in the other direction, an operating shaft journaled in said bearing, and a floating cam operatively connected to the end of the shaft beyond said bearing and acting on said ends.

LUDGER E. LA BRIE.